J. A. CONWAY.
Artificial Irrigation.
No. 202,331. Patented April 16, 1878.
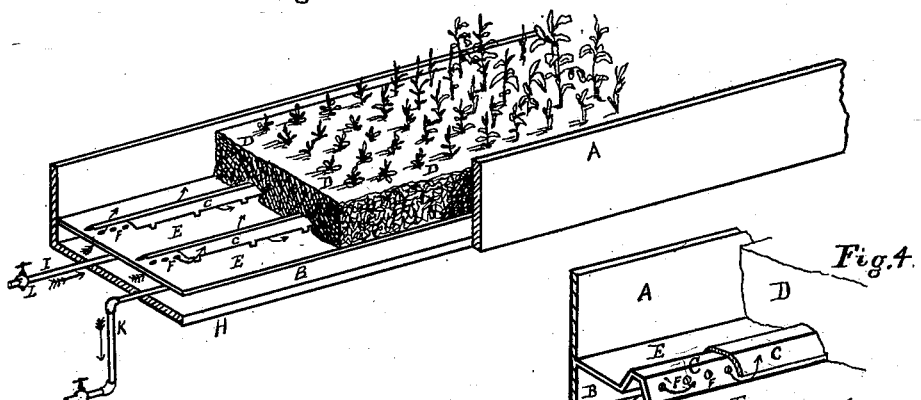
Fig. 1.
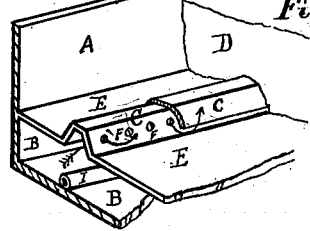
Fig. 4.
Fig. 2.
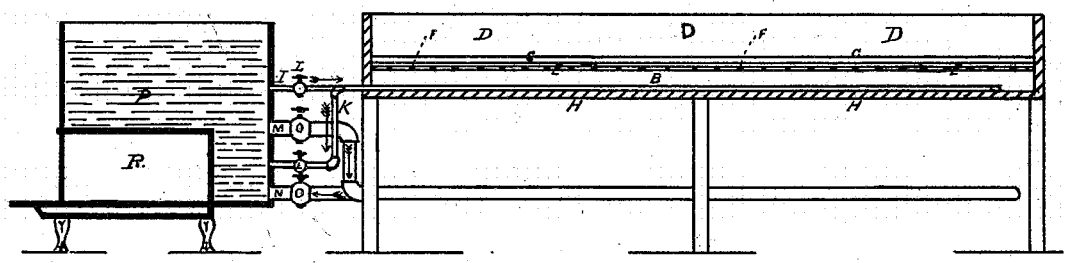
Fig. 3.
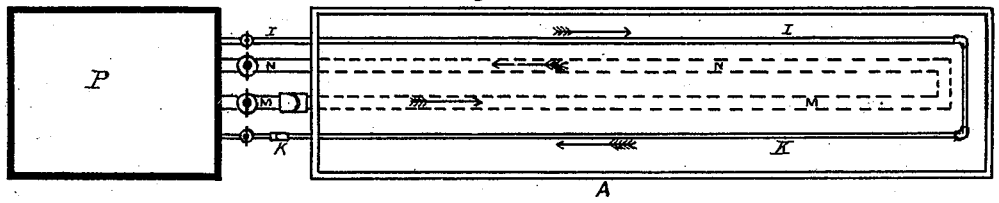
WITNESSES.
INVENTOR.

UNITED STATES PATENT OFFICE.

JOHN A. CONWAY, OF TOLEDO, OHIO.

IMPROVEMENT IN ARTIFICIAL IRRIGATION.

Specification forming part of Letters Patent No. 202,331, dated April 16, 1878; application filed March 13, 1878.

*To all whom it may concern:*

Be it known that I, JOHN A. CONWAY, of Toledo, in the county of Lucas, in the State of Ohio, have invented a new and useful Improvement in Artificial Irrigation, which improvement is fully set forth in the following specification, reference being had to accompanying drawing, of which—

Figures 1 and 4 are isometrical sections; Fig. 2, a longitudinal section, and Fig. 3 a plan.

The object of my invention is to provide for upward irrigation of earth by heated pipes, as follows:

Water-reservoir B is heated by pipes I and K, the water being evaporated through perforated plates E into the earth in chamber D, thus supplying the necessary moisture, at equable temperature, to the fibrous rootlets of plants, to facilitate natural and rapid growth. H represents the bottom of water-chamber B; A A, side and ends of water and earth chambers B and D. L and O are regulating-valves in pipes. M and N are independent heating-pipes. F F are perforations in plate E, and C shield over same for prevention of direct contact with the earth.

I claim as my invention—

The combination of water-chamber B with earth-chamber D and heating-pipes I and K, for the purpose as substantially set forth.

JOHN A. CONWAY.

Witnesses:
J. D. COOK,
C. J. SHIPLEY.